United States Patent [19]

Fessler

[11] 3,975,345

[45] Aug. 17, 1976

[54] POLYAMIDEIMIDES AND METHOD FOR MAKING

[75] Inventor: William A. Fessler, Albany, N.Y.

[73] Assignee: General Electric Company, Schenectady, N.Y.

[22] Filed: June 23, 1972

[21] Appl. No.: 265,534

[52] U.S. Cl. .......................... 260/29.2 N; 204/181; 260/78 R; 260/78 TF; 428/458
[51] Int. Cl.² ...................... C08J 3/00; C08L 77/10
[58] Field of Search .......... 260/29.2 N, 78 R, 78 TF

[56] References Cited
UNITED STATES PATENTS

| | | | |
|---|---|---|---|
| 3,518,230 | 6/1970 | Sheffer et al. .......................... | 260/78 |
| 3,666,723 | 5/1972 | Kray et al. ...................... | 260/29.2 N |

*Primary Examiner*—J. Ziegler
*Attorney, Agent, or Firm*—William A. Teoli; Joseph T. Cohen; Jerome C. Squillaro

[57] ABSTRACT

Polyamideimides, resulting from the reaction of two moles of trimellitic anhydride, per mole of organic diamine, such as methylene dianiline, followed by contacting the resulting bis(N-4-carboxyphthalimido)organo reaction product with tolylene diisocyanate, have been found to be valuable dip coating compositions for electrical conductors. The polyamideimides also can be converted to electrocoating compositions having superior shelf stability.

2 Claims, 1 Drawing Figure

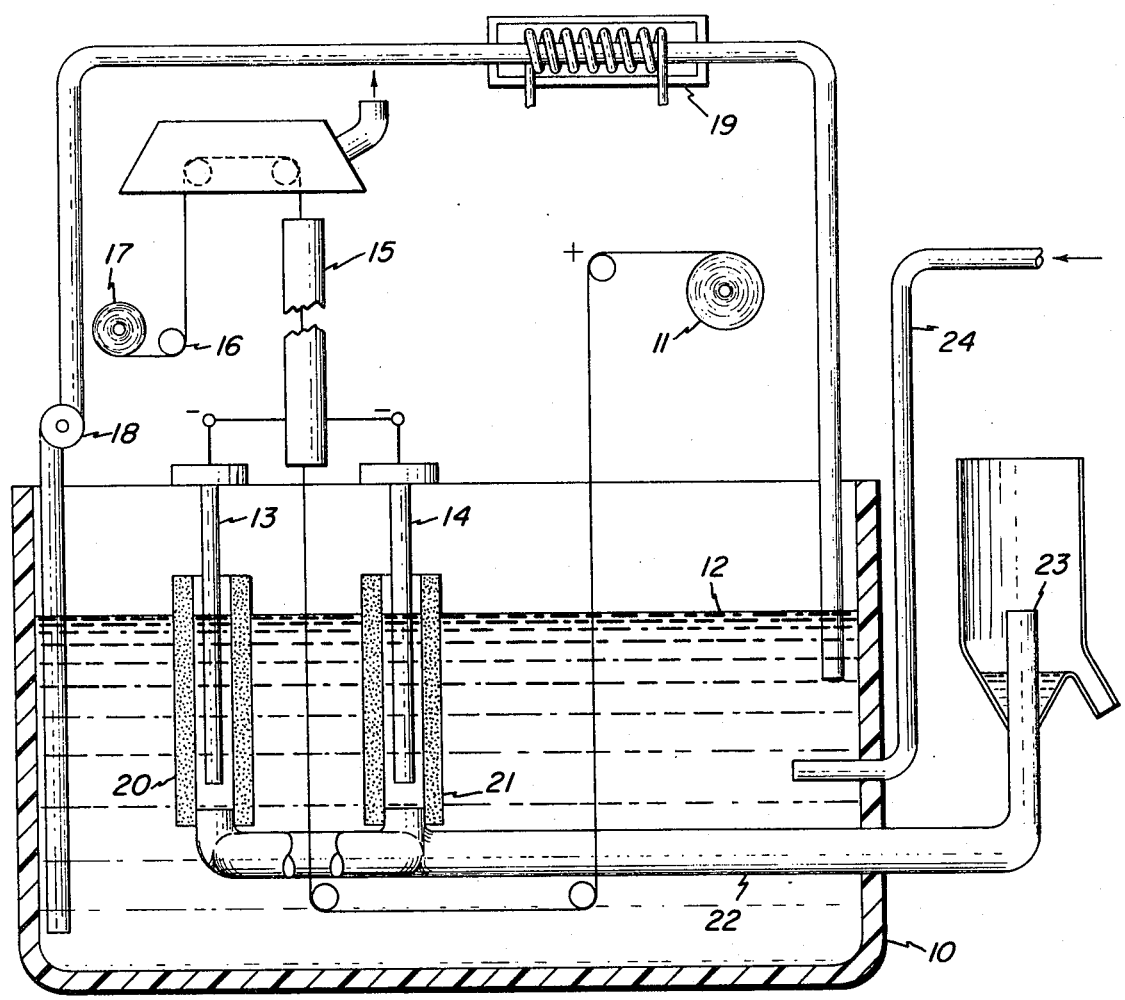

POLYAMIDEIMIDES AND METHOD FOR MAKING

The present invention relates to polyamideimides and a method for making such materials. More particularly, the present invention relates to trimellitic anhydride-organic diamine-tolylene diisocyanate reaction products which can be used as dip coating formulation for electrical conductors, and can be converted to electrocoating compositions having improved shelf stability.

The polyamideimides of the present invention can be more particularly defined as reaction products of (A) organic diisocyanate and (B) the dicarboxylic acid reaction product of two moles of trimellitic anhydride, per mole of organic diamine, where in forming the (A)-(B) polyamideimide reaction product, (A) is utilized in an amount at least sufficient to provide a substantial stoichiometric equivalence of isocyanate for the carboxy of (B).

Included by the organic diamines which can be employed in the practice of the invention are diamines shown by the following formula, $$NH_2RNH_2, \qquad (1)$$

where R is a divalent hydrocarbon radical having from 2–18 carbon atoms selected from alkylene radicals and arylene radicals. Alkylene radicals included by R are for example, ethylene, trimethylene, tetramethylene, pentamethylene, etc.; arylene radicals, such as phenylene, tolylene, xylylene, naphthylene, anthrylene, etc. In addition R also can be a divalent organo radical of the formula,

R'QR' where R' is a divalent arylene radical as defined for R, and Q is a divalent radical selected from $C_{(2-8)}$ alkylene, S, O,

and Si. Some of the organic diamines included by Formula 1 are for example, meta-phenylene diamine, paraphenylene diamine, 4,4'-diamino-3,5,3',5'-tetramethyl-diphenylmethane, 4,4'-diamino diphenyl propane, 4,4'-diamino-diphenyl methane, 4,4'-diamino diphenyl sulfide, 4,4'-diamino diphenyl sulfone, 3,3'-diamino diphenyl sulfone, 4,4'-diamino diphenyl ether, 4,4'-diamino-3,5,3',5'-tetrachlorodiphenyl methane, 2,6-diamino-pyridine, bis(4-aminophenyl)diethyl silane, bis(4-amino-phenyl)phosphine oxide, bis(4-amino-phenyl)-N-methylamine, 1,5-diamino-naphthalene, 3,3'-dimethyl-4,4'-diamino-biphenyl, 3,3'-dimethoxy benzidine, 2,4-bis-(beta-amino-t-butyl)toluene, bis-(para-beta-t-butyl-phenyl)ether, para-bis-(2-methyl-4-amino-pentyl)benzene, para-bis-(1,1-dimethyl-5-amino-pentyl)benzene, n-xylylene diamino, p-xylylene diamine, bis(para-amino-cyclohexyl) methane, hexamethylene diamine, heptamethylene diamine, octa methylene diamine, nonamethylene diamine, decamethylene diamine, etc.

Included by the organic diisocyanate which can be employed in the practice of the invention are compounds such as, $$R''(NCO)_2 \qquad (2)$$

where R'' is a divalent arylene radical having from 6–18 carbon atoms and including for example, phenylene, tolylene, xylylene, naphthylene, anthrylene, etc. Included by the diisocyanates of Formula 2 are for example, 2,4-toluene diisocyanate, 4,4'-diisocyanate diphenyl methane, isomeric mixtures of 2,4-tolylene diisocyanate and 2,6-tolylene diisocyanate etc.

In the practice of the invention, reaction is initially effected between organic diamine and trimellitic anhydride utilizing a ratio of 2 moles of the trimellitic anhydride per mole of organic diamine in the presence of a suitable inert organic solvent. A suitable inert organic solvent is any solvent which can be employed in the practice of the invention to facilitate reaction between the various components of the reaction mixture without entering into the reaction, such as N-methylpyrrolidone, etc.

Reaction between the trimellitic anhydride and the organic diamine can be performed under ambient conditions under an inert atmosphere, such as a nitrogen atmosphere while the reaction mixture is agitated, such as by mechanically stirring, etc. Temperatures during the reaction to form the initial dicarboxylic acid reaction product can vary widely and can preferably be performed either under ambient conditions or conditions whereby a temperature of 200°C is not exceeded. Reaction times can also vary widely depending upon the nature of the reactants and the degree of agitation and the like. There then can be added to the mixture an azeotroping agent such as a hydrogen solvent for example, benzene, toluene, xylene, cyclohexane, along with a catalyst, such as triphenylphosphite, etc. which can be utilized to facilitate the removal of water of reaction during reflux at temperatures up to 200°C for 4 hours or more. After a sufficient amount of water of dehydration has been collected, the remaining mixture can be cooled to effect precipitation of product. If desired a sample of the reaction mixture can be titrated to determine carboxy content.

After the carboxy equivalent weight has been determined, a solution of the organic diisocyanate in a suitable organic solvent can be added to the trimellitic anhydride-organic diamine reaction product at a temperature in the range of from 100°C to 200°C. Optionally, a tertiary amine can be added to facilitate reaction. Addition can be performed over a period of 3 hours or less by adding the diisocyanate drop wise until at least a stoichiometric equivalence between isocyanate and carboxy has been achieved. The resulting mixture can then be heated to a temperature in the range of from 180°C to 200°C for an additional period of 2 hours or less. The solution of polyamideimide can be directly employed either as a dip coating composition or it can be converted to an electrocoating composition. Experience has shown that optimum results can be achieved if after the first equivalent of organic diisocyanate has been added, the resulting mixture is further titrated to determine any residual carboxy. This residual acid then can be reacted with a further stoichiometric equivalence of organic diisocyanate.

Conversion of the polyamideimide reaction product to an electrocoatable polyamide acid salt mixture can be readily effected by following the procedure shown in copending application Ser. No. 148,154, now U.S. Pat. No. 3,737,478 of Edith Boldebuck, assigned to the same assignee as the present invention. In accordance with the aforementioned copending application, a predetermined amount of a strong base is added to the polyamideimide in the presence of a polar organic solvent. Suitable polar organic solvent include the aprotic organic solvent as previously defined, such as N-methylpyrrolidone, dimethylacidamide, etc. Among the bases which can be employed are any organic or inorganic base having an ionization constant greater than $10^{-2}$ and preferably greater than $10^{-1}$ in water at 25°C. Some of these bases are shown by the following formula, M O H, where M is a member selected from alkali metal ions and tetraorgano ammonium ions. In instances where M is alkali metal, M also can be chemically combined with —OG radicals where G is selected from alkyl radicals and aryl radicals. Included by the bases which can be employed are for example, alkali metal hydroxides, such as sodium, potassium, lithium, etc.; tetraalkyl ammonium hydroxides, such as tetramethyl, tetrabutyl, etc., alkoxides such as sodium methoxide, potassium ethoxide, etc., phenoxides, such as sodium phenoxides, potassium phenoxides, etc. In addition, organic bases such as guanadine, etc., and alkali metal salts of weak acids having acid diisociation constants of $10^{-7}$ or less, which produces alkali metal hydroxides insitu in aqueous solutions also can be employed.

The polar organic solvents which can be employed in the practice of the invention are preferably polar aprotic solvents chemically inert to the reactants during the practice of the invention. Some of the solvents which can be employed are for example, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl-2-pyrrolidone, tetramethyl urea, pyridine, dimethylsulfone, tetramethylene sulfone, N-methylformamide, N-acetyl-2-pyrrolidone. In addition, other diluent solvents substantially inert during the practice of the method can also be utilized, such as aliphatic hydrocarbons, ethers, etc.

Sufficient base is employed to provide for about 0.05 to about 1 meq of polyamide acid salt radical, per gram of polyamideimide. Total imide functionality can be readily determined by employment of potentiometric titration where the base is added until the end point is reached. Once the total imide functionality is known, the proper amount of base can be added to the mixture to obtain the desired ratio of meq of base per gram of polyamideimide.

Knowing the weight of the sample in grams and the volume of base required to reach end point, the total moles of imide can be readily calculated in the sample utilized by the following relationship:

$$\frac{cc \text{ of base} \times \text{normality of base}}{\text{weight of polymer sample}}$$

The weight of polymer associated with one equivalent of functional group also can be calculated by the formula:

$$\frac{1000}{\text{meq of functional group/gram of polymer}}$$

The resulting polyamide acid salt mixture can be employed in electrocoating of conductors either in a batch type method or in a continuous method as described in copending application of John Lupinski and James McQuade, (RD-4901), filed concurrently herewith and assigned to the same assignee as the present invention.

In order that those skilled in the art will be better able to practice the invention, the following examples are given by way of illustration and not by way of limitation. All parts are by weight.

EXAMPLE 1

There was added 76.85 parts of trimellitic anhydride to a solution containing 39.65 of methylene dianiline dissolved in 255 parts of N-methylpyrrolidone to produce a solution having a mole ratio of trimellitic anhydride to methylene dianiline of 2 to 1. The mixture was cooled in an ice bath and the contents were stirred for 3 hours. The solution was then allowed to warm to room temperature and 50 parts of xylene and 0.1 part of triphenylphosphite were added. This solution was then heated to reflux for 10 hours. Water was evolved and collected. A sample of the solution was removed and titrated with a standard base solution in accordance with known procedures and there was found 1.014 meq of carboxy per gram of solution. This indicated that there was produced 4,4'-bis(N-4-carboxyphthalimido)diphenylmethane.

There was added to 128.32 parts of the above described bis(N-4-carboxyphthalimido)diphenylmethane, a solution of 11.33 parts in the form of an isomeric mixture of toluene diisocyanates in a N-methylpyrrolidone solution at 20% solids to produce a mixture having 130.12 meq of carboxy and 130.12 meq of isocyanate. The addition of the toluene diisocyanate was performed in a drop wise manner over a period of 1 hour starting at a temperature of 110°C. The temperature was then increased to 160°C and maintained for 1 hour after the addition had been completed. The mixture was then allowed to cool to room temperature. There was obtained a viscous red-brown solution.

There was added drop wise over a period of 1 hour to the above described polyamideimide solution with stirring, a 1N sodium hydroxide solution to produce a final composition having 0.8 meq of sodium hydroxide, per gram of polyamideimide. The resulting mixture was then adjusted to 5% solids and a proportion of 2 parts of N-methylpyrrolidone per part of water to produce an electrocoating composition. A replenishment solution containing 7.5% solids was also prepared following the same procedure.

Utilizing a 2" wide aluminum foil in the apparatus shown in the drawing, a foil speed of approximately 1 ½ feet per minute and a current of approximately 1 amp, there was obtained a cured polyamideimide aluminum composite foil having a polyamideimide film thickness of 0.8 mil. During a 3 ¾ hour period of continuous electrocoating, there was employed 3800 parts of the 7 ½% make up mixture which was introduced at 24 and there was collected 19.85 parts of base and solvent from the overflow tube at 23 derived from the cathode compartments consisting of cathodes 13 and 14 and ceramic membranes 20 and 21. The temperature of the bath was maintained at 35°–45°C using cooling coil 19 and pump 18. During continuous electrocoating of the aluminum foil, the bath composition remained constant at about 5% solids and the amount of sodium hydroxide in the bath was sufficient to maintain about a 0.8 meq of base per gram of polymer solids.

The above procedure was repeated except that in place of the polyamideimide prepared in accordance with the present invention, having a ratio of two moles of trimellitic anhydride per mole of organic diamine, there was utilized a polyamideimide which was prepared by effecting reaction between substantially equal molar amounts of trimellitic anhydride and methylene dianiline followed by reacting the resulting amideimide reaction product with a stoichiometric equivalent of the isomeric toluene diisocyanate mixture. An electrocoating bath was prepared following the procedure described above. An aluminum foil was electrocoated using the control composition. A comparison of the two aluminum polyimide composites was made to demonstrate the criticality of the composition of the present invention with respect to ability to resist cracking at 180° bend in air at 300°C and percent weight loss after 24 days at 250°C. The results obtained are shown in the following table where dicarboxy represents the composition of the present invention and carboxy represents the control where percent weight loss is the weight loss after 24 days at 250°C and 180° bend was measured as described above.

|  | Wt. Loss | 180° Bend |
| --- | --- | --- |
| dicarboxy | 2¼ | 10 hours |
| carboxy | 4½ | 1 hour |

The above results show that the polyamideimide made in accordance with the present invention is unexpectedly superior even though the same reactants are employed establishing the critical proportions of such reactants.

Although the above examples are limited to only a few of the very many polyamideimide reaction products which can be employed in the practice of the invention, it should be understood the present invention is directed to a much broader class of such polyamideimide resulting from the reaction of organic diamine of formula 1 and the organic diisocyanate of formula 2 in combination with trimellitic anhydride.

What I claim as new and desire to secure by Letters Patent of the United States is:

1. An electrocoating composition comprising (1) polyamide acid, (2) water, (3) organic solvent and a sufficient amount of (4) base to provide about 0.05 to about 1 meq of base per/gram of polymer, where said polyamide acid is the product of reaction of a polyamideimide and a base having an ionization constant greater than $10^{-2}$ in water at 25°C in the presence of an aprotic organic solvent for the polyamideimide, which is the reaction product of toluene diisocyanate and the dicarboxylic acid reaction product of two moles of trimellitic anhydride, per mole of organic diamine, where in forming the polyamideimide toluene diisocyanate is utilized in an amount at least sufficient to provide a substantially stoichiometric equivalence between isocyanate and carboxy of the dicarboxylic acid reaction product.

2. An electrocoating composition in accordance with claim 1, which has about a 0.8 meq of sodium hydroxide per gram of polymer.

* * * * *